United States Patent

Soennecken et al.

[11] Patent Number: 5,474,159
[45] Date of Patent: Dec. 12, 1995

[54] FRICTION LINING AND METHOD FOR MANUFACTURING A FRICTION LINING

[75] Inventors: Hartmut Soennecken, Kürten-Busch; Wolf Savary, Bergisch Gladbach, both of Germany

[73] Assignee: Textar GmbH, Germany

[21] Appl. No.: 162,135

[22] PCT Filed: Jun. 12, 1992

[86] PCT No.: PCT/EP92/01254

§ 371 Date: Feb. 4, 1994

§ 102(e) Date: Feb. 4, 1994

[87] PCT Pub. No.: WO92/22756

PCT Pub. Date: Dec. 23, 1992

[30] Foreign Application Priority Data

Jun. 13, 1991 [DE] Germany ............... 41 19 515.9

[51] Int. Cl.⁶ .................................................. F16D 69/02
[52] U.S. Cl. ............... 188/251 A; 188/73.1; 188/250 B; 188/251 M
[58] Field of Search ............... 188/251 R, 251 A, 188/251 M, 73.1, 250 B, 250 R, 256, 257, 250 G, 264 G; 192/107 M; 428/252, 245, 246

[56] References Cited

U.S. PATENT DOCUMENTS

| | | | |
|---|---|---|---|
| 2,251,410 | 8/1941 | Koehring et al. | 188/251 M |
| 2,359,361 | 10/1944 | Gleszer et al. | 188/251 M X |
| 3,585,102 | 6/1971 | Burgess | 188/251 M X |
| 3,899,050 | 8/1975 | Savary et al. | 188/251 A X |
| 4,273,219 | 6/1981 | Ito | 188/251 M X |
| 4,373,038 | 2/1983 | Moraw et al. | 188/251 A X |
| 4,815,572 | 3/1989 | Froberg et al. | 188/251 M |
| 4,926,978 | 5/1990 | Shibata et al. | 188/251 M X |
| 5,242,746 | 9/1993 | Bommier et al. | 188/251 A X |

FOREIGN PATENT DOCUMENTS

| | | | |
|---|---|---|---|
| 0271965 | 6/1988 | European Pat. Off. . | |
| 2821323 | 11/1979 | Germany . | |
| 4119515 | 12/1992 | Germany . | |
| 3130937 | 6/1988 | Japan | 188/251 M |
| 0830322 | 3/1960 | United Kingdom | 188/251 M |

Primary Examiner—Robert J. Oberleitner
Assistant Examiner—Peter M. Poon
Attorney, Agent, or Firm—Diller, Ramik & Wight

[57] ABSTRACT

In the case of a friction lining, intended in particular for brake systems and comprising a friction element consisting of asbestos-free friction lining material and an abrasive element consisting of abrasive material with a thermosetting binder on the basis of natural or synthetic resin, it is provided that an abrasive element is incorporated in the friction element which, as wear of the friction lining advances, enables the frictional properties of the surface which presses against the lining to be regenerated at intervals.

11 Claims, 3 Drawing Sheets

FRICTION LINING AND METHOD FOR MANUFACTURING A FRICTION LINING

BACKGROUND OF THE INVENTION

From DE 21 33 455 A1 and DE 23 62 190 A1, friction linings are known on the free surface of which an abrasive layer is provided which serves for evening out surface variations, particularly flute formations on the counterpart of the friction lining, by abrasion.

This flute formation is said to be evoked by insufficient possibilities for removing chips in case of surface contact of the frictional partners. Known abrasive layers consist of abrasive particles, e.g. carborundum, $Al_2O_3$, pounce and the like, which are bound with one or several binders, modified phenolic resins or the derivatives thereof, such as cresol resin and the like.

The binding agents on the basis of natural or synthetic resins have thermo-setting properties and a temperature stability corresponding to that of the frictional material From DE-A-23 62 190, it is known to give a wave-shaped configuration to the abrasive layer on the surface of the friction lining in order to provide for a reliable removal of chips in any operational state of the brake. The layer thickness of the abrasive layer amounts to approximately 0.3 to 0.6 mm.

So far, the known abrasive layers have been used in connection with brake pads containing asbestos.

Due to the legally regulated introduction of asbestosfree brake pads, new problems arise in practice during the operation of brakes equipped in such a manner.

Checks of such braking systems have shown that the wear behaviour at a low temperature is much more unfavourable than in case of brakes with asbestos-containing pads, i.e. the wear of the brake disk is higher at low working temperatures of the brake. This is particularly disadvantageous with vehicles in short-distance operation, wherein the brake arrangements do not reach elevated working temperatures, but also with vehicles driven over a long distance, wherein the brake arrangement may cool down completely between two braking processes.

FIG. 1 shows the quantitative wear behaviour V of the brake disk in dependence on the temperature [C° ] for asbestos-containing (a) and asbestos-free (b) brake pads in comparison. The different wear behaviour mainly depends on the working temperature of the brake arrangement.

The latter promotes the formation of nonuniform wear, namely differences in thickness, at the brake disk. These differences in thickness result in the so-called brake rubbing, i.e. in strong braking force variations during the braking process. This leads to vibrations of low frequency which may be transferred to the components of the entire vehicle and thus impair driving security and the service life of the brake arrangement.

According to present knowledge, these differences in thickness are produced by periodical contact of the pad with the rotating disk in the non-braked state. These may be caused, e.g., by tolerances of the brake arrangement with respect to measurements, withdrawal moments of the wheel brake cylinders or of axis components, From DE 28 21 323 A1, a brake friction block is known wherein an intermediate layer being embedded in the friction lining is provided, which serves as heat barrier.

SUMMARY OF THE INVENTION

It is the object of the invention to provide a friction lining with abrasive elements which also permits, during the advancing wear of the friction lining, a regeneration of the friction-technical counterpart of the friction lining in the meantime.

To arrange abrasive elements in layers has the advantage that the friction lining can function as friction element and that the abrasive element is not used until after certain states of wear of the friction lining have occurred so that a regeneration of the friction-technical counterpart of the friction lining is regularly effected after predetermined laid-up times.

In case of such a configuration of the friction lining, however, it is necessary that the coefficient of friction of the abrasive element matches the coefficient of friction of the friction element in order to avoid friction coefficient differences.

A further solution according to the invention is to provide an abrasive element extending transversely to the direction of movement of the friction-technical counterpart of the friction element in a partial portion of the friction element over the entire width of the friction element and, starting from the surface of the friction element, into the depth, and/or with a friction element consisting of a mixture of friction lining material and abrasive material, which, compacted together, form a combined uniform friction and abrasive layer.

Due to the fact that the friction element extends transversely to the direction of movement of the friction-technical counterpart of the friction element in a partial portion of the friction element over the entire width of the friction element and, starting from the surface of the friction element, into the depth, continuous abrasing of the friction partner, e.g. a brake disk, is possible, so that the formation of unevenness due to the surface contact of the friction partners is avoided. Such a preferably strip-shaped arrangement of the abrasive element within the friction element also has the advantage to have a uniform influence on the coefficient of friction of the friction linings, so that the abrasive element need not necessarily have the same coefficient of friction as the friction element.

Another solution, according to the invention, is to fibre-reinforce the abrasive element with a percentage by weight/volume of about 1 to 30%, preferably 5 to 20%.

All natural mineral, synthetic mineral and/or organic fibres, such as basalt, aramide, carbon, glass or ceramic fibres can be used as fibre reinforcement.

In one embodiment, the fibre-reinforced abrasive element contains a mixture of aramide, glass and/or carbon fibres, an adaptation to the coefficient of friction of the friction element being effected via the mixing ratio of the fibres. In this case, the effect of the fibres is utilized, aramide fibres, for example, generating a soft abrasive effect and glass fibres a hard abrasive effect.

According to the method of the invention, it is provided to separately manufacture layer-shaped abrasive elements, for example by extrusion, pressing or punching, and to subsequently compact these layer-shaped abrasive elements together with already prepressed friction element layers or with pulverized friction material.

Referring to the drawings, embodiments of the invention will be described in detail.

DESCRIPTION OF THE PREFERRED EMBODIMENTS

Figure 1:
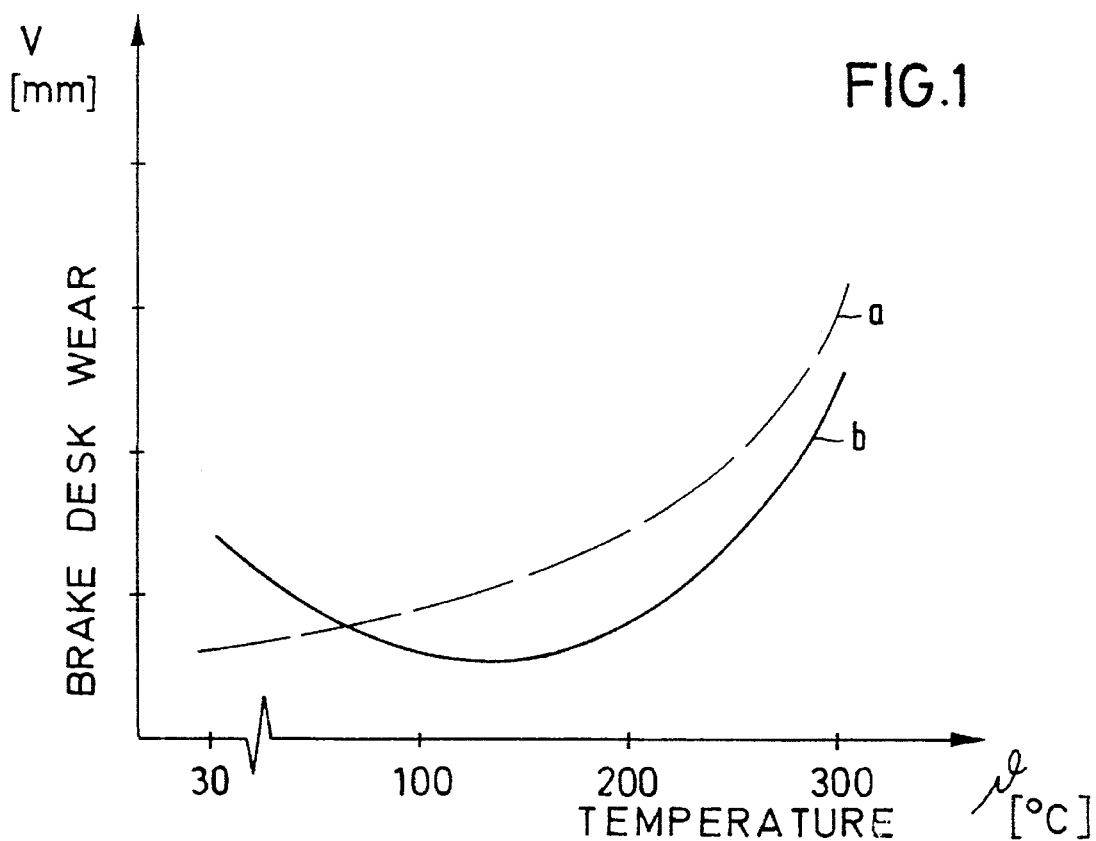
FIG. 1 shows a comparison of the wear behaviour of brake disks in dependence on the temperature of the brake disk.
Figure 2:
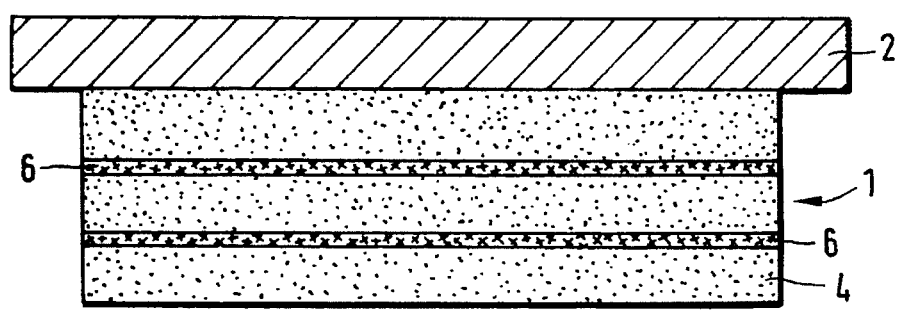
FIG. 2 shows a first embodiment of a friction lining comprising integrated abrasive element layers.

FIG. 2 shows layer-shaped abrasive element layers 6 integrated in a friction lining 1 consisting of several friction element layers 4.

The different layers 4,6 can be readily manufactured. There is the possibility to lay them, in the form of a sheet, into the compression mould or to manufacture the layers 4,6 according to the known method by dumping and pressing the layer materials. With respect to the dumping and pressing method, the sheet has the advantage that the thickness of the layers can be arranged in the friction lining 1 in a precisely defined manner, always having a constant thickness. The advantage of such a brake block or friction lining is that the friction-technical counterpart, in this case a brake disk, is regularly regenerated, corresponding to accurately defined states of wear, namely after the wear of a certain friction layer 4, by means of the abrasive layer 6.

In this embodiment, it is essential that the coefficient of friction of the abrasive element layer exactly matches the coefficient of friction of the friction element layer, so that no friction coefficient differences arise in case of different states of wear of the respective brake blocks.

Figure 3:
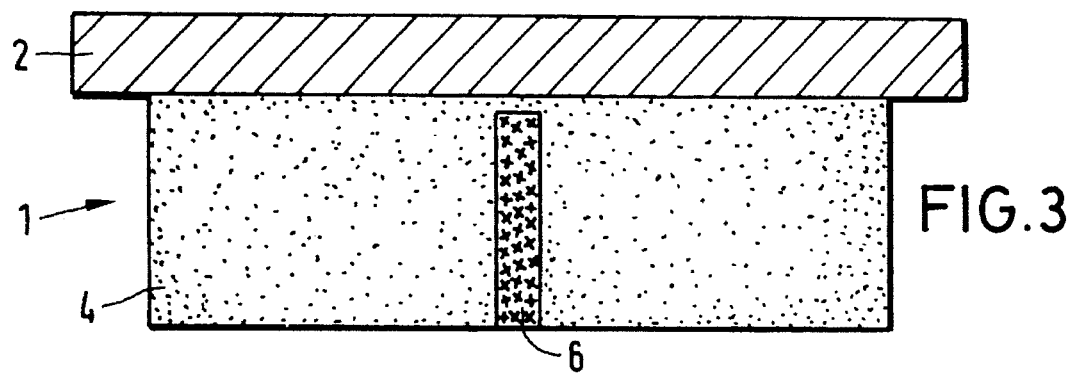
FIG. 3 shows a second embodiment with a strip-shaped abrasive element extending axially over the entire width of the friction lining.
Figure 4:
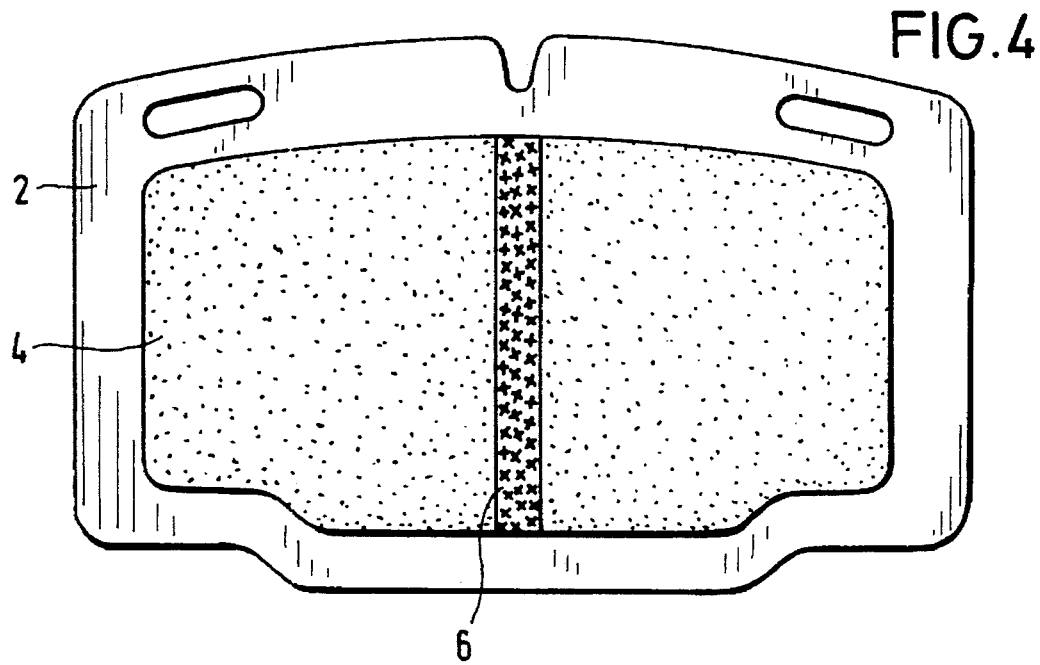
FIG. 4 shows a front view of the embodiment according to FIG. 3.

FIG. 3 and FIG. 4 show another embodiment wherein the abrasive element axially extends from the surface of the friction lining 1 into the depth and radially over the entire width of the friction lining 1, and actually orthogonally to the direction of movement of the counter friction surface, which is the brake disk in this embodiment. The abrasive element extends to just before the lining support plate 2 but does not contact it. Such a friction lining guarantees a continuous abrasive process.

Figure 5:
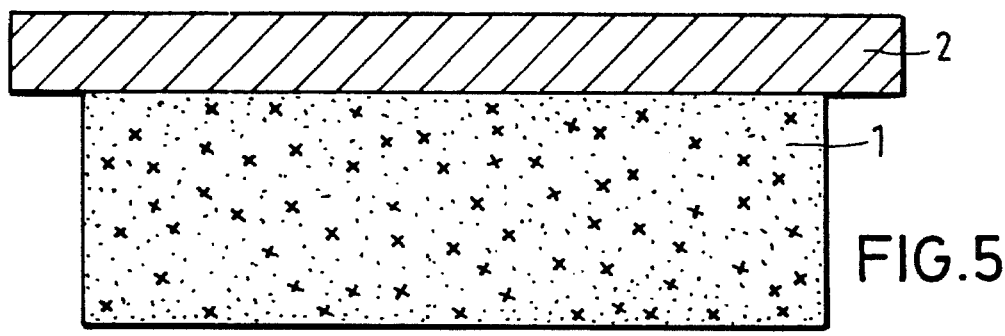
FIG. 5 shows a brake block including a friction lining consisting of a mixture of friction lining material and abrasive material.

FIG. 5 shows another embodiment, wherein the abrasive layer material is conditioned as granule and mixed, in a defined quantity, with the friction lining material and compacted to form a uniform mass together therewith. Such a friction lining has the advantage that the abrasive function, similar to the embodiment of FIG. 3, is continuously effective during the entire service life of the brake pad and thus maintains the counter friction surface, i.e. the brake disk, in an optimum state. The abrasive effect can be easily adjusted by means of the recipe, i.e. individual ideal friction conditions can be established for the different requirements made on the brake arrangement and the corresponding brake pad.

The reinforcement of the abrasive material with aramide fibres generates a rather soft abrasive effect and a reinforcement with glass fibres an effect to the contrary.

The mixture of various fibres, e.g., aramide fibres, glass fibres, and carbon fibres, and the proportional ratio with respect to each other permit to predetermine different abrasive effects and to optimumly adapt to the coefficient of friction of the friction lining.

Figure 6:
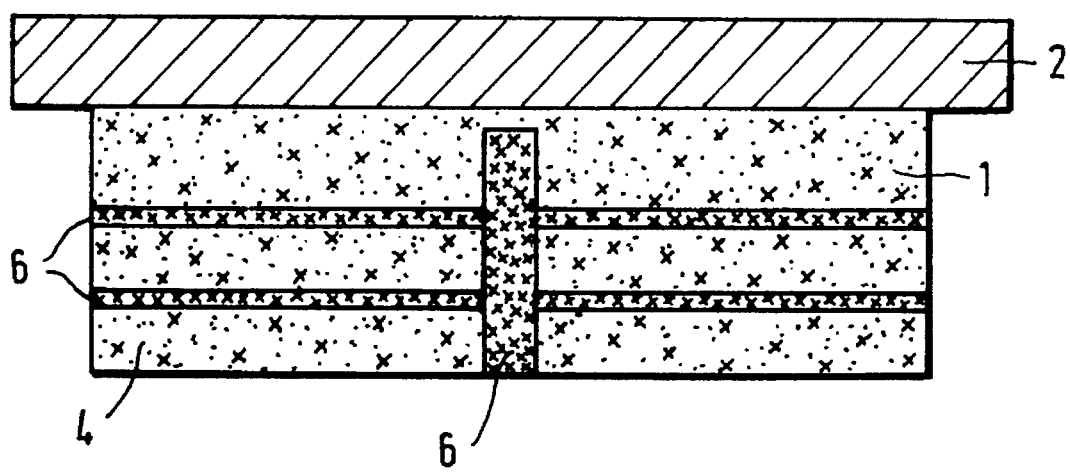
FIG. 6 shows a brake block with a combination of different abrasive elements.

FIG. 6 shows an embodiment wherein the abrasive element 6 is partly arranged as an intermediate layer between successive friction element layers, partly extends, starting from the surface of the friction element, in the form of a strip over the entire width orthogonally to the direction of movement of the friction-technical counterpart of the friction element, e.g. a brake disk, into the depth of the friction element, and/or, by being added to the friction lining material, is partly compacted in combination therewith to form a friction/abrasive layer.

The abrasive element in the form of an intermediate layer can also be combined only with the abrasive additive to the friction lining material.

What is claimed is:

1. A friction lining for refurbishing a frictional surface of a braking means comprising a layer shaped friction element comprising an asbestos-free friction lining material and a layer shaped abrasive element comprising abrasive material with a thermo-setting binding agent of natural or synthetic resin, characterized in that said abrasive element (6) is arranged, as an intermediate layer, between successive friction element layers (4) whereby upon the wearing away of a friction layer element (4), a successive abrasive element (6) is exposed for abrading away and smoothing said frictional surface thereby maintaining said surface in an optimum state.

2. The friction lining according to claim 1, characterized in that an additional abrasive element (6) extends, in the form of a strip, starting from the surface of said friction element (1), over the entire width orthogonally to the direction of movement of an associated brake disk into the depth of the friction element (1).

3. The friction lining according to claim 1, characterized in that said abrasive element (6) is fibre-reinforced with a percentage by weight/volume of about 1 to 30%.

4. The friction lining according to claim 3, characterized in that said fibre-reinforced abrasive element (6) contains aramide fibres. of about 1 to 30%, preferably 5 to 20%.

5. The friction lining according to claim 3, characterized in that said fibre-reinforced abrasive element (6) contains aramide fibres.

6. The friction lining according to claim 3, characterized in that said fibre-reinforced abrasive element (6) contains carbon fibres.

7. The friction lining according to claim 3, characterized in that said fibre-reinforced abrasive element (6) contains a mixture of aramide fibres, basalt fibres, natural mineral fibres, synthetic mineral fibres, glass fibres, ceramic fibres or carbon fibres, and in that the coefficient of friction of the friction element (4) is achieved by the ratio of the admixed fibres.

8. The friction lining according to claim 1 characterized in that said abrasive element (6) is fibre-reinforced with a percentage by weight/volume of about 5 to 20%.

9. The friction lining according to claim 1 wherein all layers exhibit substantially the said coefficient of friction.

10. A method of manufacturing friction linings by compacting an asbestos-free friction lining material to form friction element layers, characterized by separately manufacturing a layer-shaped abrasive element by extruding, pressing or punching and by subsequently compacting the layer-shaped abrasive element, as an intermediate layer, together with several friction element layers whereby in use the wearing away of a friction element layer exposes a successive abrasive element for abrading away and smoothing an associated frictional surface thereby maintaining said surface in an optimum state.

11. The friction lining manufacturing method according to claim 8 wherein all layers exhibit substantially the same coefficient of friction.

* * * * *